(12) United States Patent
Luo et al.

(10) Patent No.: US 9,527,213 B2
(45) Date of Patent: Dec. 27, 2016

(54) AUTOMATIC STAIR-CLIMBING ROBOT PLATFORM

(71) Applicant: National Taiwan University, Taipei (TW)

(72) Inventors: Ren C. Luo, Taipei (TW); Ming Hsiao, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 0 days.

(21) Appl. No.: 14/495,263

(22) Filed: Sep. 24, 2014

(65) Prior Publication Data

US 2016/0031497 A1   Feb. 4, 2016

(30) Foreign Application Priority Data

Jul. 31, 2014   (TW) .............................. 103126262 A

(51) Int. Cl.
*B25J 9/16*   (2006.01)

(52) U.S. Cl.
CPC ............. *B25J 9/1694* (2013.01); *Y10S 901/01* (2013.01)

(58) Field of Classification Search
CPC ................................. A61G 5/061; A61G 5/066
USPC .............................. 180/8.1, 8.2, 8.3, 8.4, 203
See application file for complete search history.

(56) References Cited

U.S. PATENT DOCUMENTS

| | | | |
|---|---|---|---|
| 5,701,965 A * | 12/1997 | Kamen et al. | 180/7.1 |
| 6,484,829 B1 * | 11/2002 | Cox | 180/8.1 |
| 7,926,598 B2 * | 4/2011 | Rudakevych | 180/9.32 |
| 2004/0160124 A1 * | 8/2004 | Arai | 307/10.1 |
| 2010/0076598 A1 * | 3/2010 | Herbert et al. | 700/245 |
| 2010/0294575 A1 * | 11/2010 | Martel | 180/8.2 |
| 2014/0009561 A1 * | 1/2014 | Sutherland et al. | 348/14.05 |
| 2014/0076642 A1 * | 3/2014 | Gettings et al. | 180/9.1 |
| 2015/0129328 A1 * | 5/2015 | Behrens | 180/8.3 |
| 2015/0190925 A1 * | 7/2015 | Hoffman et al. | 700/257 |

\* cited by examiner

*Primary Examiner* — Jacob Knutson
*Assistant Examiner* — Felicia L Brittman
(74) *Attorney, Agent, or Firm* — Rabin & Berdo, P.C.

(57) ABSTRACT

An automatic stair-climbing robot platform is provided. The automatic stair-climbing robot platform of the present invention includes a personal computer module; a USB-CAN interface module; a motor module, including a plurality of motors and controlled by the USB-CAN interface module; a KINECT sensor module, obtaining point cloud data and image data by sensing a terrain ahead and transmitting the point cloud data and image data to the personal computer module; a first inertial measurement unit, measuring a body tilt of the KINECT sensor module, and transmitting data of the body tilt of the KINECT sensor module to the personal computer module; and a second inertial measurement unit, measuring a body tilt of the automatic stair-climbing robot platform, and transmitting data of the body tilt of the automatic stair-climbing robot platform to the personal computer module.

9 Claims, 4 Drawing Sheets

AUTOMATIC STAIR-CLIMBING ROBOT PLATFORM

CROSS-REFERENCES TO RELATED APPLICATION

This application claims the priority of Taiwanese patent application No. 103126262, filed on Jul. 31, 2014, which is incorporated herewith by reference.

BACKGROUND OF THE INVENTION

Field of the Invention

The present invention relates to a robot, and more particularly, to an automatic stair-climbing robot platform.

The Prior Arts

Nowadays, due to advances of semiconductor processes and electronic technologies, the development and demand of robots have not only become rapid, the application of robots has expanded to various other industries such as food, clothing, housing, transportation, recreation and health care industries. Based on the applications of robots, robots can be categorized as industrial robots, business automation robots, household robots, medical robots, educational robots and entertainment robots.

In general, industrial robots refer to a humanoid body constituting of a mechanical main body, a controller, a servo drive and a sensor, or it is referred to as a mechatronics production equipment and instrumentation. Moreover, industrial robots may directly receive commands, and may also execute a pre-programmed procedure, or may develop their moving patterns based on artificial intelligence technologies. In addition, business automation robots may include robots for 3D printing, business automation, vending systems and food and beverage ordering systems. Moreover, household robots may include robots such as home automation, smart appliances, smart buildings and navigation service robots. Medical and health care robots may include robots such as assistive and rehabilitation robots, wearable products and intelligent massaging robots. Additionally, educational and entertainment robots may emphasize on an intuitive human-computer interaction diversified entity.

However, the above-mentioned robot moves only on flat grounds, but is not able to automatically overcome obstacles in the physical environment. Therefore, some robots, such as humanoid robots, wheeled robots and crawler robots, have been developed to overcome spatial obstacles.

However, humanoid robots and wheeled robots have the disadvantages of high power consumption and difficulty of controlling. Also, although the wheeled robots and crawler robots are easier to control, these robots usually move on flat grounds, otherwise balance is difficult to be maintained and stability will be affected while moving. Thus, the problem of leaping spatial obstacles (such as climbing stairs) is still unresolved.

Therefore, for the sake of meeting the requirement of providing a robot with low power consumption and high balance while moving in physical environments, it is necessary to provide a robot having high safety, high stability and low cost.

SUMMARY OF THE INVENTION

In view of the drawbacks of the aforementioned prior arts, one of the main objectives of the present invention is to provide a vertical robot platform together with a wheeled robot having the benefits of low power consumption and the function of robot-human interaction, which allows a user to move on flat grounds by means of wheels; and climbing a flight of stairs in an vertical manner, while maintaining balance and stability in the process of climbing.

To achieve this and other objectives, the present invention provides a stair-climbing robot platform, including: a personal computer module; a USB-CAN interface module; a KINECT sensor module, obtaining point cloud data and image data by sensing a terrain ahead, and transmitting the point cloud data and image data to the personal computer module; a first inertial measurement unit, measuring a body tilt of the KINECT sensor module, and transmitting data of the body tilt of the KINECT sensor module to the personal computer module; and a second inertial measurement unit, measuring a body tilt of the automatic stair-climbing robot platform, and transmitting data of the body tilt of the automatic stair-climbing robot platform to the personal computer module.

Preferably, the automatic stair-climbing robot platform may further include a USB-I/O interface module and a brake module. The brake module may be controlled by the USB-I/O interface module.

Preferably, the automatic stair-climbing robot platform may further include a power supply module, including a plurality of batteries. The plurality of batteries may be charged, and the power supply module may provide power to the personal computer module, the motor module, the KINECT sensor module, the first inertial measurement unit module and the second inertial measurement unit module.

Preferably, the automatic stair-climbing robot platform may further include a main body for supporting standing of a user; a vertical structure, fixed in the front end of the main body, and comprising a pair of handles and an emergency button, wherein the personal computer module, the USB-CAN interface module, the KINECT sensor module, the first inertial measurement unit module and the second inertial measurement unit module may be disposed on the vertical structure; a plurality of wheels and two rotating discs, wherein the two rotating discs are respectively placed on the two sides of the main body, and each rotating disc may include three wheels of the plurality of wheels, two of the plurality of motors drives the plurality of wheels on two sides of the main body, and the other two of the plurality of motors drives the two rotating discs; and a spring module for connecting the main body and the two rotating discs.

Preferably, the personal computer module may be one of an industrial computer, an industrial controller and an embedded system.

Preferably, the personal computer module of the automatic stair-climbing robot platform may include a stair detection function, a somatosensory control function, a body tilt function and a motion control function.

Preferably, the automatic stair-climbing robot platform may automatically move back and forth, turn left and right and rotate on the spot.

Preferably, the automatic stair-climbing robot platform may climb a flight of stairs via the plurality of wheels and the two rotating discs on its two sides.

Preferably, the brake module may be controlled by an emergency relay module.

As described above, in comparison to common means in the art, the present invention may carry the user, and may move on flat grounds by means of wheels. Moreover, when climbing stairs, the automatic stair-climbing robot platform of the present invention may automatically detect the terrain of stairs, and also enabling the user to maintain balance and stability in a vertical manner during the stair-climbing process. Therefore, the present invention has the benefits of being safe, flexible, reduced costs and ease of use.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
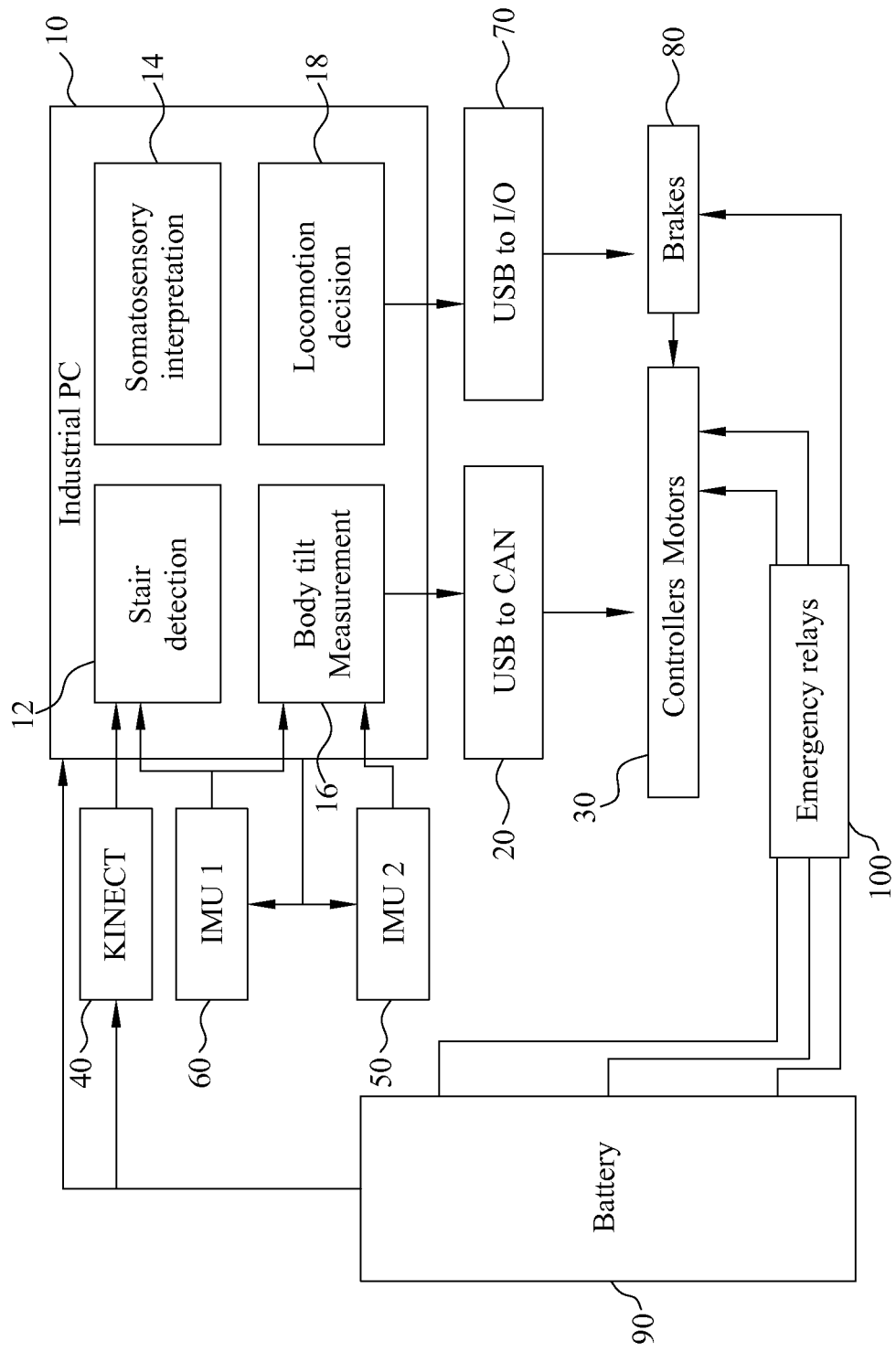
FIG. 1 is a system block diagram illustrating an automatic stair-climbing robot platform according to the present invention.

The accompanying drawings are included to provide a further understanding of the invention, and are incorporated in and constitute a part of this specification. The drawings illustrate embodiments of the invention and, together with the description, serve to explain the principles of the invention.

With regard to FIGS. 1-4, the drawings showing embodiments are semi-diagrammatic and not to scale and, particularly, some of the dimensions are for clarity of presentation and are shown exaggerated in the drawings. Similarly, although the views in the drawings for ease of description generally show similar orientations, this depiction in the drawings is arbitrary for the most part. Generally, the present invention can be operated in any orientation.

In light of the foregoing drawings, as shown in FIG. 1, the present invention provides an automatic stair-climbing platform, which includes a personal computer module 10; a USB-CAN interface module 20; a motor module 30, including a plurality of motors 32, wherein the motor module 30 is controlled by the USB-CAN interface module 20; a KINECT sensor module 40, obtaining point cloud data and image data by sensing a terrain ahead, and transmitting the point cloud data to the personal computer module 10; a first inertial measurement unit (IMU) module 50, measuring a body tilt of the KINECT sensor module 40, and transmitting data of the body tilt of the KINECT sensor module 40 to the personal computer module 10; and a second IMU module 60, measuring a body tilt of the automatic stair-climbing robot platform, and transmitting data of the body tilt of the automatic stair-climbing robot platform to the personal computer module 10.

According to an embodiment of the present invention, the KINECT sensor module 40 may be a device similar to a webcam, including three lenses, whereby the lenses on both the right and left sides of the KINECT sensor module 40 are respectively an infrared emitter and a 3D structured light depth sensor composed of an infrared camera; and the middle lens being a RGB color camera. Additionally, the KINECT sensor module 40 also has a tracking feature, and the small motor placed in the interior moves automatically as the object of focus moves.

In addition, for controlling and operating the automatic stair-climbing robot platform, the automatic stair-climbing robot platform may further include a USB-I/O interface module 70 and a brake module 80. The brake module 80 may be controlled by the USB-I/O interface module 70.

Moreover, the automatic stair-climbing robot platform may further include a power supply module 90, which includes a plurality of batteries. The plurality of batteries may be charged, whereby the power supply module 90 may provide power to the personal computer module 10, the motor module 30, the KINECT sensor module 40, the first IMU module 50 and the second IMU module 60.

Figure 2:
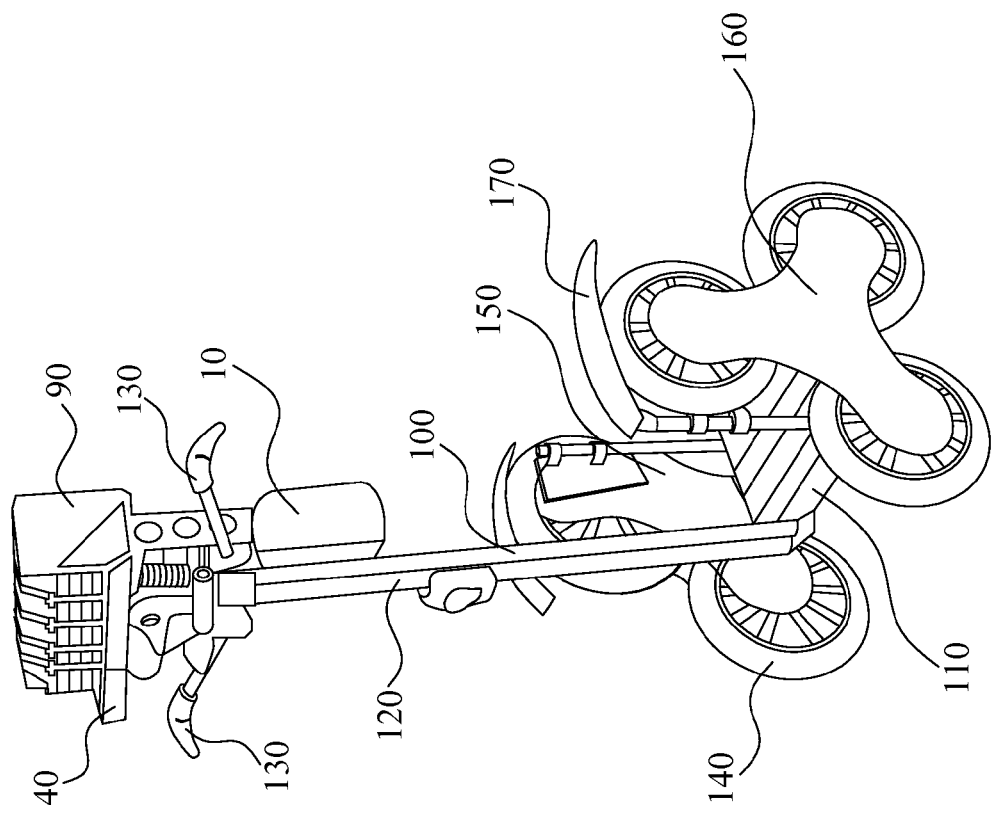
FIG. 2 is a perspective view showing the automatic stair-climbing robot platform according to the present invention.

FIG. 2 shows a perspective view of the automatic stair-climbing robot platform according to an embodiment of the present invention.

As shown in FIG. 1 and FIG. 2, the automatic stair-climbing robot platform may further include a main body 110, allowing a user to stand on it; a vertical structure 120, fixed in the front end of the main body 110. The automatic stair-climbing robot platform may also include a pair of handles 130 and an emergency button (not shown). The personal computer module 10, USB-CAN interface 20, the KINECT sensor module 40, the first IMU module 50 and the second IMU module unit 60 are all placed on the verticals structure 120. The automatic stair-climbing robot platform may also include a plurality of wheels 140 and two rotating discs 150. The two rotating discs 150 are respectively placed on the two sides of the main body 110. Each of the two rotating disc 150 may include three of a plurality of wheels 140. Two of the plurality of motors (not shown) drive the plurality of wheels 140 on the two sides of the main body 110. Further, the other two of the plurality of motors drive the two rotating discs 150 on the two sides of the main body 110. The plurality of motors may be disposed underneath the main body 110.

Moreover, according to an embodiment of the present invention, the personal computer module 10 may be one of an industrial computer (industrial PC), an industrial controller or an embedded system.

With regard to the automatic stair-climbing robot platform of the present invention, the personal computer module 10 of the present invention serves functions such as a stair detection function 12, a somatosensory control function 14, a body tilt function 16 and a locomotion decision function 18.

Further, the automatic stair-climbing robot platform of the present invention automatically may move back and forth, turn left and right and rotate on the spot.

According to an embodiment of the present invention, the automatic stair-climbing robot platform may go up and down a flight of stairs via the plurality of wheels 140 on the two sides and via the two rotating discs 150.

The brake module 80 may also be controlled by an emergency relay module 100.

The present invention may further include a spring module (not shown). The spring module is connected to the main body 110 and the rotating discs 150, and may enable the automatic stair-climbing robot platform to have a small amplitude of moving back and forth, and thus achieving the function of somatosensory control.

According to an embodiment of the present invention, as shown in FIG. 2, the automatic stair-climbing platform may further include a pair of wheel protective shell 160 and a fender 170.

Figure 3:
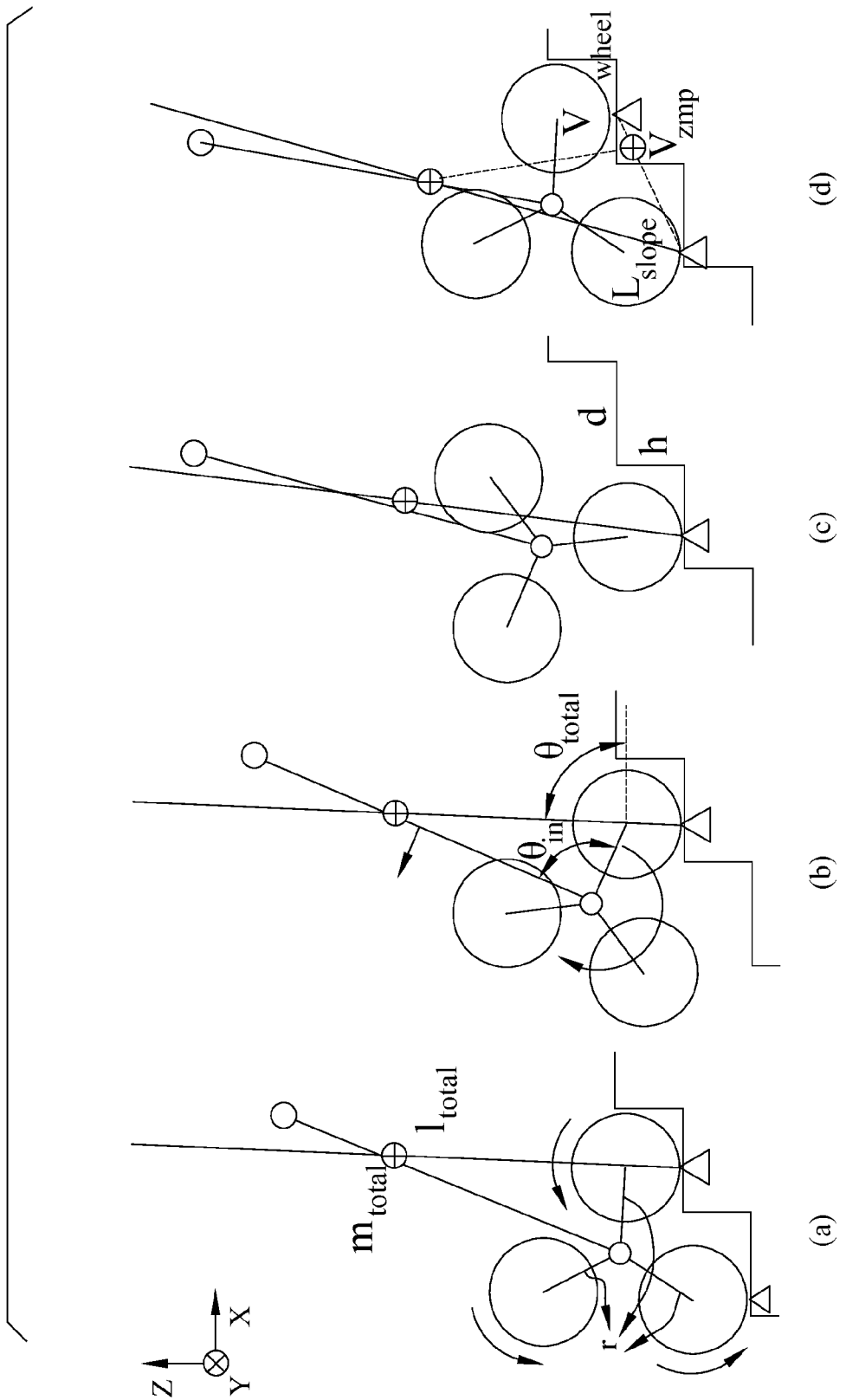
FIG. 3 (3a-3d) is a schematic diagram showing the center of mass of the automatic stair-climbing robot platform according to the present invention FIG. 4 (4a-4c) is a schematic diagram showing the climbing types exhibited by the automatic stair-climbing robot platform according to the present invention.

Referring to FIG. 3 (3a-3d), FIG. 3 shows a schematic diagram illustrating the center of mass of the automatic stair-climbing platform according to the present invention.

In order to allow the automatic stair-climbing robot platform and the user to maintain a state of balance during the stair-climbing process, when a flight of stairs is sensed, the personal computer module of the automatic stair-climbing platform performs calculations based on the control parameters of the two rotating discs. Thus, the center of mass may be automatically changed to a suitable position. This is followed by climbing the stairs by controlling the two rotating discs. The controlling parameters may include the mass $m_{total}$ and length $l_{total}$ of the automatic stair-climbing robot platform (as shown in FIG. 3), the angle of the robot platform relative to the x axis ($\theta_{total}$ and $\theta_{in}$) (as shown in FIG. 3b), the depth (d) and height (h) of the stairs (as shown in FIG. 3c), and the $L_{slope}$ and $v_{wheel}$ and $v_{zmp\ (zero-moment\ point)}$ (as shown in FIG. 3d).

In other words, as shown in FIG. 3, the automatic stair-climbing platform of the present invention may automatically sense the depth (d) and height (h) of the flight of stairs, and performing calculations on control parameters of the two rotating discs, so as to adjust the angle and speed of rotation of the two rotating discs.

Figure 4:
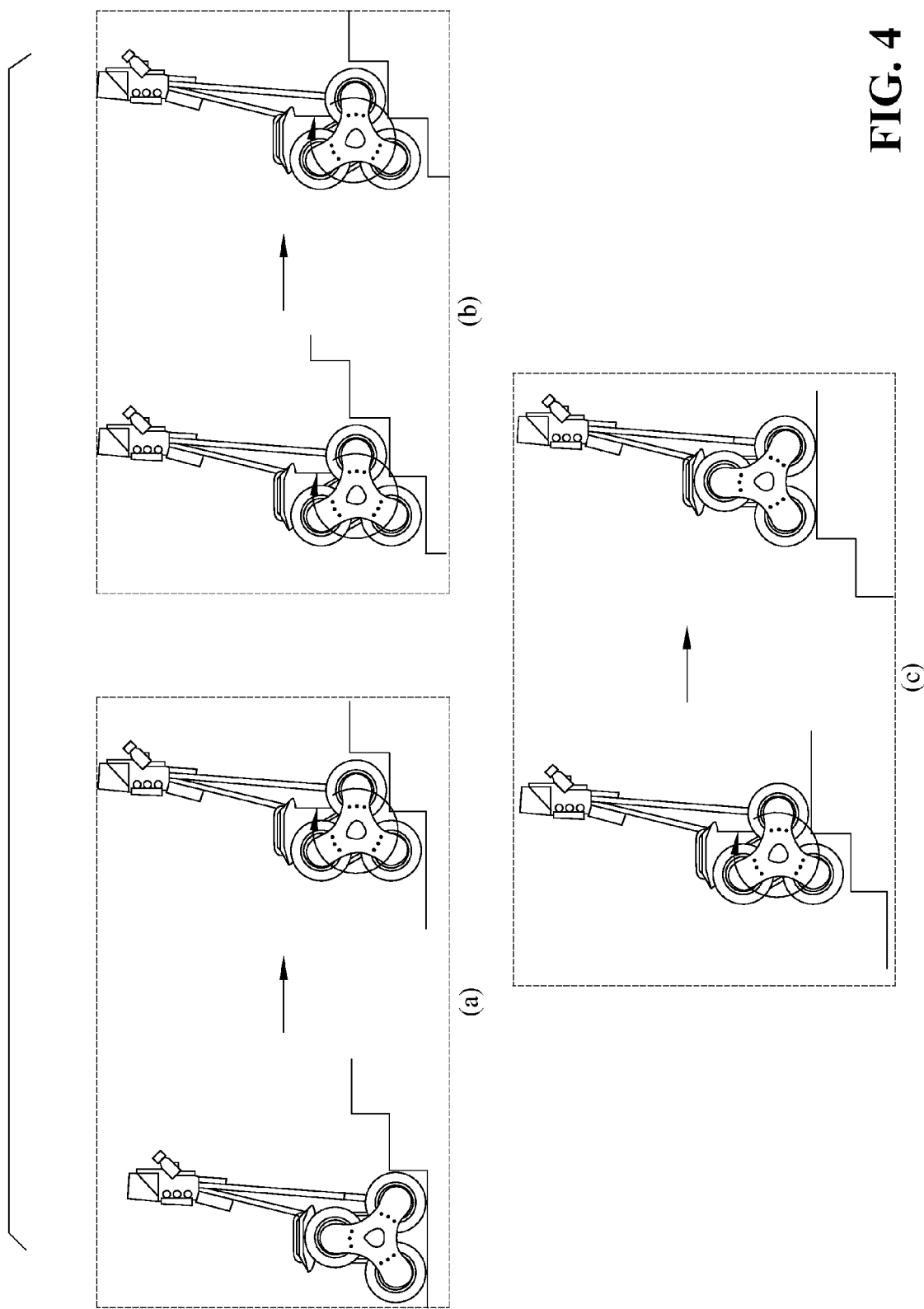

Further, FIG. 4 (4a-4c) shows the climbing types exhibited by the automatic stair-climbing robot platform according to the present invention.

As shown in FIG. 4, the stair-climbing process may be divided into three types: the first type (as shown in FIG. 4a) occurs when a flight of stairs ahead is detected by the automatic stair-climbing robot platform when moving on flat ground; the second type (as shown in FIG. 4b) occurs during the stair-climbing process itself; and the third type (as shown in FIG. 4c) occurs when the automatic stair-climbing robot platform is climbing a flight of stairs, and senses that the terrain ahead is flat.

It should be noted that when controlling and operating the automatic stair-climbing robot platform during the aforesaid first two types of stair climbing processes, the angle and speed of rotation of the two rotating discs need to be the same. However, during the third type of stair-climbing process, the angle and speed of rotation of the two rotating discs are to be further adjusted, to allow the automatic stair-climbing robot platform and the user to main balance and stability while moving.

Additionally, the automatic stair-climbing robot platform of the present invention is able to obtain point cloud data and image data by sensing different terrains ahead by means of the KINECT sensing module, and transmitting the point cloud data to the personal computer module. The first IMU module measures a body tilt of the KINECT sensor module, and transmits data of the body tilt of the KINECT sensor module to the personal module. The second IMU module measures a body tilt of the automatic stair-climbing robot platform, and transmits data of the body tilt of the automatic stair-climbing robot platform to the personal computer module. Subsequently, the personal computer module performs calculations on the plurality of wheels and the control parameters of the two rotating discs. The center of mass of the automatic stair-climbing robot platform of the present invention may be automatically changed to the suitable position, by adjustments of the plurality of wheels and the angle and speed of rotation of the two rotating discs. As such, the present invention enables the automatic stair-climbing robot platform and the user to maintain balance and have increased stability while moving on non-flat terrains.

In view of all of the above, the present invention provides an automatic stair-climbing robot platform suitable for climbing stairs. This automatic stair-climbing robot platform climbs stairs in a balanced and stable manner, overcoming the problem of leaping spatial obstacles. This allows the user to move up and down a flight of stairs with stability. Therefore, the automatic stair-climbing robot platform of the present invention not only solves the currently unresolved problem of only being able to move on flat grounds, but it also further increases the stability and safety of the user while moving.

The above exemplary embodiment describes the principle and effect of the present invention, but is not limited to the present invention. It will be apparent to those skilled in the art that various modifications and variations can be made to the disclosed embodiments. It is intended that the specification and examples be considered as exemplary only, with a true scope of the disclosure being indicated by the following claims and their equivalents.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An automatic stair-climbing robot platform, comprising:
    a computer module;
    a USB-CAN interface module;
    a motor module, having a plurality of motors and controlled by the USB-CAN interface module;
    a motion sensing input module, obtaining point cloud data and image data by sensing a terrain ahead, and transmitting the point cloud data and image data to the computer module;
    a first inertial measurement unit module, measuring a body tilt of the motion sensing input module, and transmitting data of the body tilt of the motion sensing input module to the computer module; and
    a second inertial measurement unit, measuring a body tilt of the automatic stair-climbing robot platform, and transmitting data of the body tilt of the automatic stair-climbing robot platform to the computer module.

2. The automatic stair-climbing robot platform according to claim 1, further comprising a USB-I/O interface module and a brake module, wherein the brake module is controlled by the USB-I/O interface module.

3. The automatic stair-climbing robot platform according to claim 2, wherein the brake module is controlled by an emergency relay module.

4. The automatic stair-climbing robot platform according to claim 1, further comprising a power supply module, including a plurality of batteries, and the power supply module provides power to the computer module, the motor module, the motion sensing input module, the first inertial measurement unit module and the second inertial measurement unit module.

5. The automatic stair-climbing robot platform according to claim 1, further comprising a main body for supporting standing of a user; a vertical structure, fixed in the front end of the main body and comprising a pair of handles and an emergency button, wherein the computer module, the USB-CAN interface module, the motion sensing input module, the first inertial measurement unit module and the second inertial measurement unit module are disposed on the vertical structure; a plurality of wheels and two rotating discs, wherein the two rotating discs are respectively placed on two sides of the main body, and each rotating disc comprises three wheels of the plurality of wheels, two of the plurality of motors drive the plurality of wheels on the two sides of the main body, and another two of the plurality of motors drive the two rotating discs; and a spring module for connecting the main body and the two rotating discs.

6. The automatic stair-climbing robot platform according to claim 5, wherein the automatic stair-climbing robot platform climbs a flight of stairs via the plurality of wheels and the two rotating discs.

7. The automatic stair-climbing robot platform according to claim 1, wherein the computer module is one of an industrial computer, an industrial controller and an embedded system.

8. The automatic stair-climbing robot platform according to claim 1, wherein the computer module comprises a stair detection function, a somatosensory control function, a body tilt function and a motion control function.

9. The automatic stair-climbing robot platform according to claim 1, wherein the automatic stair-climbing robot platform automatically moves back and forth, turns left and right and rotates on the spot.

\* \* \* \* \*